United States Patent
Machida

(10) Patent No.: US 8,594,391 B2
(45) Date of Patent: Nov. 26, 2013

(54) FINGER-BASED IDENTIFICATION SYSTEMS AND METHODS

(75) Inventor: Akihiro Machida, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2020 days.

(21) Appl. No.: 10/839,921

(22) Filed: May 6, 2004

(65) Prior Publication Data

US 2005/0249387 A1 Nov. 10, 2005

(51) Int. Cl.
*G06K 9/00* (2006.01)

(52) U.S. Cl.
USPC .......................................... 382/124; 382/119

(58) Field of Classification Search
USPC ......................................... 382/115, 119, 124
See application file for complete search history.

(56) References Cited

U.S. PATENT DOCUMENTS

| | | | |
|---|---|---|---|
| 3,755,805 A * | 8/1973 | Dandrel et al. | 345/26 |
| 5,828,772 A * | 10/1998 | Kashi et al. | 382/119 |
| 5,933,515 A * | 8/1999 | Pu et al. | 382/124 |
| 6,052,475 A | 4/2000 | Upton | |
| 6,421,453 B1 | 7/2002 | Kanevsky et al. | |
| 6,603,462 B2 * | 8/2003 | Matusis | 345/173 |
| 2003/0179910 A1 | 9/2003 | Wong | |
| 2004/0042642 A1 * | 3/2004 | Bolle et al. | 382/115 |
| 2004/0208348 A1 * | 10/2004 | Baharav et al. | 382/124 |

FOREIGN PATENT DOCUMENTS

WO WO 02/28067 4/2002

* cited by examiner

*Primary Examiner* — Chan S Park
*Assistant Examiner* — Eueng-Nan Yeh

(57) ABSTRACT

Finger-based identification systems and methods are described. In one aspect, a two-dimensional fingerprint image of a person's finger contacting an input surface is captured. Finger trace data is captured from movement of the person's finger over the input surface. Based on the captured two-dimensional fingerprint image and the captured finger trace data, a determination is made whether the person corresponds to an enrolled person.

22 Claims, 6 Drawing Sheets

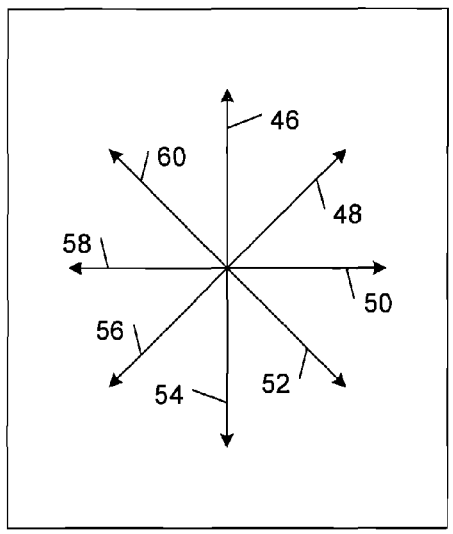
FIG. 5
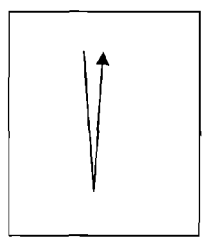 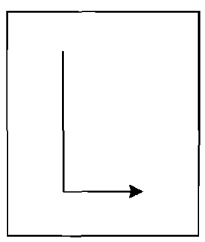 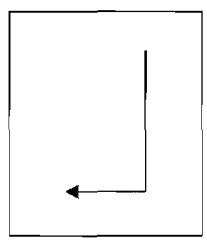 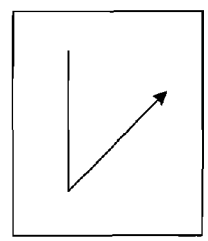
FIG. 6A  FIG. 6B  FIG. 6C  FIG. 6D
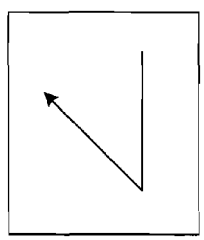 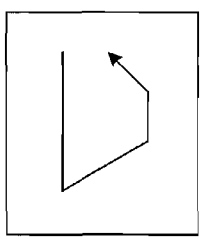 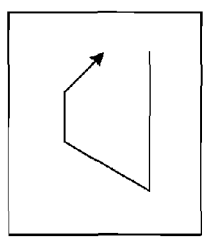 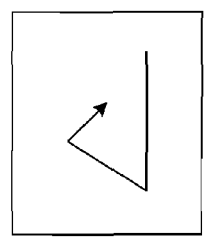
FIG. 6E  FIG. 6F  FIG. 6G  FIG. 6H

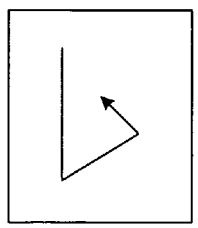 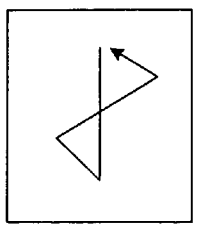 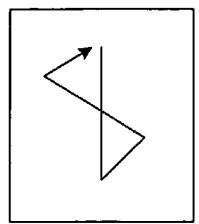 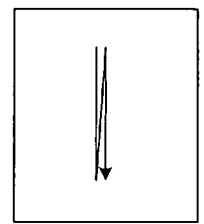
FIG. 6I  FIG. 6J  FIG. 6K  FIG. 6L
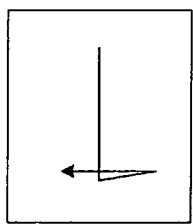 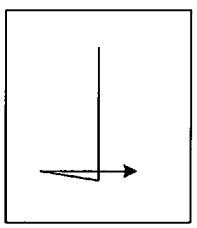 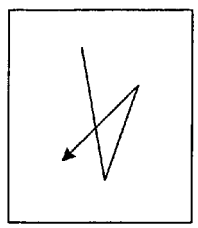 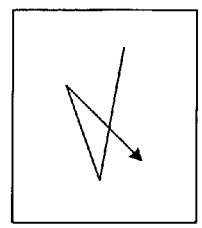
FIG. 6M  FIG. 6N  FIG. 6O  FIG. 6P
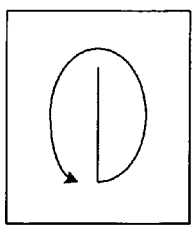 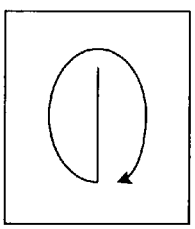 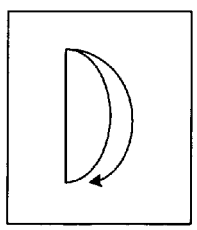 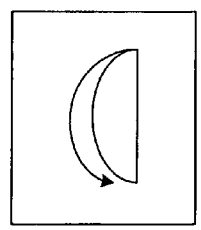
FIG. 6Q  FIG. 6R  FIG. 6S  FIG. 6T
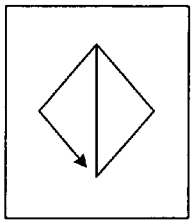 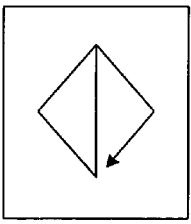 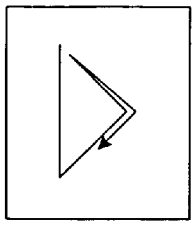 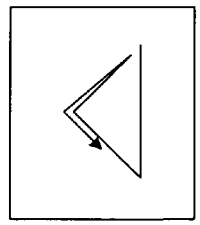
FIG. 6U  FIG. 6V  FIG. 6W  FIG. 6X

FINGER-BASED IDENTIFICATION SYSTEMS AND METHODS

BACKGROUND

Security systems for restricting access to areas or resources typically include schemes for identifying individuals before access is granted. In general, these identification schemes may infer an individual's identity based upon knowledge of restricted information (e.g., a password), possession of a restricted article (e.g., a passkey), or one or more inherent physical features of the individual (e.g., a matching reference photo or biometric indicia). In general, restricted information and restricted articles are more easily acquired by improper means than biometric data, which describes characteristic elements of person's body or behavior. For this reason, there has been an increasing push to incorporate biometric identification techniques into security systems for a wide range of applications.

Finger-based identification is a common way to verify the identity of a person. Most finger-based identification techniques rely on the uniqueness of a person's fingerprints to identify the person. Typical fingerprint identification techniques extract singularities (e.g., core points and delta points) and minutia (e.g., ridge endings and ridge branches) from a fingerprint image, and categorize characteristic patterns (e.g., arches, loops, and whorls) in the fingerprint image to define a fingerprint signature or template that may be stored and used for comparison with subsequently acquired fingerprints to verify the identity of a person.

A variety of different types of scanners have been used to capture fingerprint images. Optical scanners capture inverse images of a fingerprint based on light reflection from a person's finger placed on an input surface of an optical scanner. Capacitive scanners, on the other hand, capture direct images of fingerprints based on the different capacitive effects of finger ridges and valleys on the input surface of a capacitive scanner. Two-dimensional fingerprint scanners capture two-dimensional images of a finger, whereas one-dimensional fingerprint scanners capture one-dimensional linear traces across a finger. In general, two-dimensional scanners provide higher security and repeatability than one-dimensional fingerprint scanners.

Although fingerprint-based identification techniques provide convenient ways to uniquely identify persons, these techniques are not foolproof. For example, people often leave residual fingerprints on surfaces that they touch. In fact, residual fingerprints may remain on two-dimensional fingerprint sensors after each fingerprint verification session. These residual fingerprints may be acquired by persons who wish to impersonate a person who has access to a restricted area or a restricted resource. Over time, techniques for acquiring a person's fingerprint for improper use are expected to improve, rendering fingerprint-based security systems less secure.

SUMMARY

In one aspect of the invention, a two-dimensional fingerprint image of a person's finger contacting an input surface is captured. Finger trace data is captured from movement of the person's finger over the input surface. Based on the captured two-dimensional fingerprint image and the captured finger trace data, a determination is made whether the person corresponds to an enrolled person.

Other features and advantages of the invention will become apparent from the following description, including the drawings and the claims.

DESCRIPTION OF DRAWINGS

FIG. 5 is a diagrammatic view of a set of eight movement directions for translating finger trace data into a personal identifier in accordance with an implementation of the enrollment method of FIG. 2.

FIGS. 6A-6X respectively show exemplary finger traces corresponding to different respective personal identifiers.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The finger-based identification embodiments described in detail below leverage the accuracy of two-dimensional fingerprint verification and the additional security of knowledge-based personal identification to provide highly accurate, secure and robust person identification systems and methods for identifying a person. In addition, these embodiments incorporate finger-based input of personal identifiers in a way that substantially avoids residual fingerprints, thereby reducing the opportunity for theft of a person's fingerprint for illicit purposes. For example, in some implementations, the process of entering the finger trace data wipes residual fingerprints from the input surface.

Figure 1:
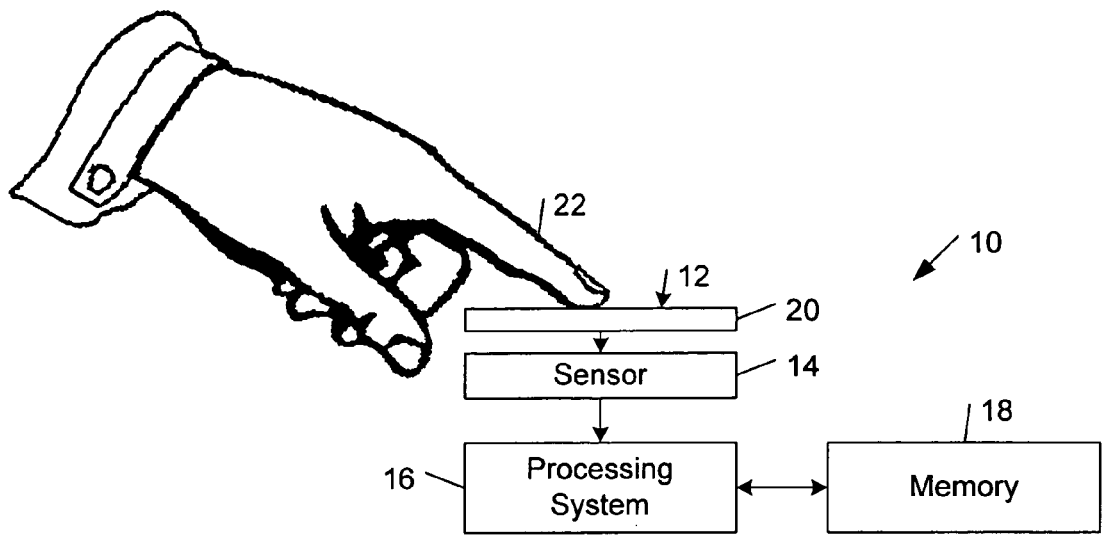
FIG. 1 is a diagrammatic view of a person's finger contacting an input surface of an embodiment of an identification system.

FIG. 1 shows an embodiment of an identification system 10 that includes an input surface 12, a sensor 14, a processing system 16, and a memory 18.

The input surface 12 corresponds to a surface of a contact fixture 20. The contact fixture 20 may be optically transparent or it may include one or more optically transparent openings through which light may pass between the sensor 14 and a person's finger 22. In one implementation, the contact fixture 20 is formed of glass. The input surface 12 may be smooth or contoured to the shape of a person's finger 22.

The sensor 14 may be any type of sensor that is configured to capture a two-dimensional image of the portion of the person's finger 22 contacting the input surface 12, including any type of optical sensor, capacitive sensor, a resistive matrix sensor or a micro-machined switch array sensor. In some implementations, the sensor 14 is an optical sensor that includes at least one imaging device (e.g., a CCD or a CMOS imaging device) that is configured to generate signals proportional to the intensity of light received through the contact fixture 20 over a one- or two-dimensional area. In some implementations, the imaging device includes an elongated rectangular array of pixel elements that are arranged to capture a two-dimensional fingerprint image of a person's finger during a period of relative movement between the person's finger and the input surface 12 (e.g., when the person's finger is swept over the field of view of the imaging device). In other implementations, the imaging device includes a rectangular array of pixel elements that are capable of imaging a two-dimensional area of the input surface 12 that is large enough to capture an image of the area of contact between the input surface 12 and a person's finger placed on the input surface 12. In some implementations, the optical sensor includes an optical filter that allows only light within prescribed wavelength range to reach the imaging device. The optical sensor may include a lens and other optical components that are configured to direct light received through the contact fixture 20 to the optical sensor. Some implementations also include a light source (e.g., a light emitting diode or a laser diode) that is configured to illuminate a person's finger contacting the input surface 12 through the contact fixture 20. In these implementations, the optical sensor is configured to detect light from the light source that reflects off the person's finger and returns through the contact fixture 20.

The processing system 16 samples signals from the sensor 14. In some implementations, the processing system 16 conditions the signals received from the sensor 14 with one or more signal processing modules, such as a noise filter and an analog-to-digital converter. In addition, as described in detail below, the processing system 16 is operable to compute fingerprint data from the two-dimensional fingerprint image captured by sensor 14 and to map finger trace data, which is captured by sensor 14 and relates to movement of the person's finger over the input surface 12, to a personal identifier. Based on the fingerprint data and the personal identifier, the processing system 16 is operable to determine whether a person corresponds to a person enrolled with the system 10.

The two-dimensional fingerprint image data and the finger trace data captured by the sensor 14 may be data that is received directly from the sensor 14 or it may be data that has been processed by one or more signal processing modules (e.g., a filter or analog-to-digital converter) that are located upstream of the processing system 16. The processing system 16 is not limited to any particular hardware or software configuration, but rather it may be implemented in any computing or processing environment, including in digital electronic circuitry or in computer hardware, firmware, device driver, or software, and may be supplemented by or incorporated in one or more specially designed ASICs (application-specific integrated circuits).

The memory 18 stores data generated by the processing system 16, including temporary data, intermediate data, data sampled from sensor 14, computed fingerprint data, computed finger trace data, and translated personal identifiers. In some implementations, memory 16 is an erasable, rewritable memory chip that holds its content without power, such as a flash RAM or a flash ROM memory chip. Other implementations may use a different type of memory.

Figure 2:
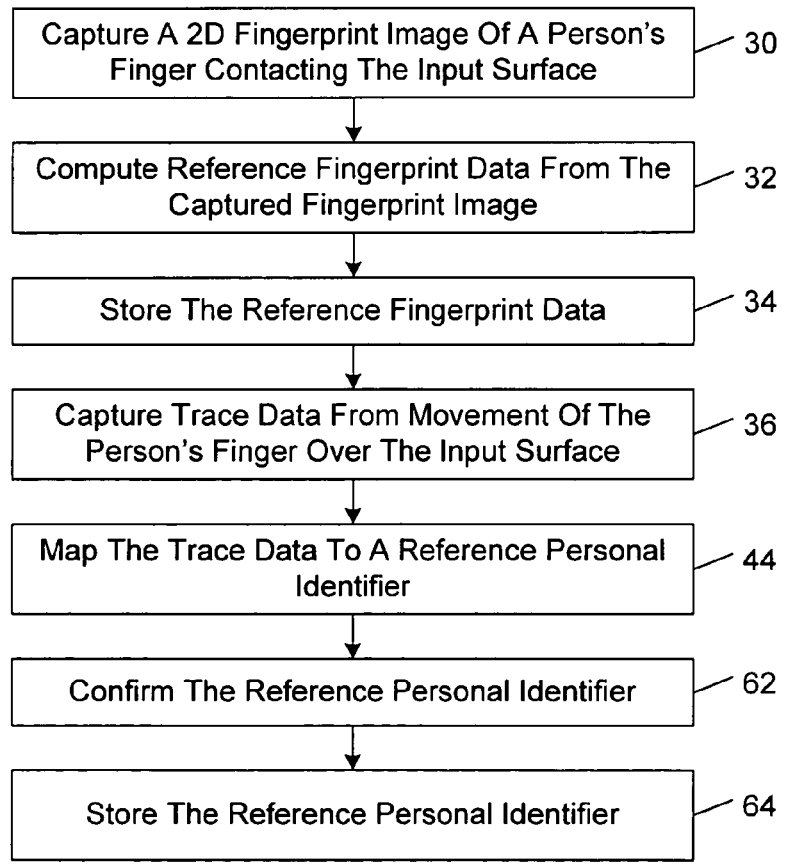
FIG. 2 is a flow diagram of an embodiment of a method or enrolling a person in the identification system of FIG. 1.

FIG. 2 shows an embodiment of a method enrolling a person in a security system incorporating the identification system 10. The security system may be designed, for example, to control and monitor access to a restricted area or a restricted resource and the identification system 10 may be used to identify individual before access is granted.

Figure 3:
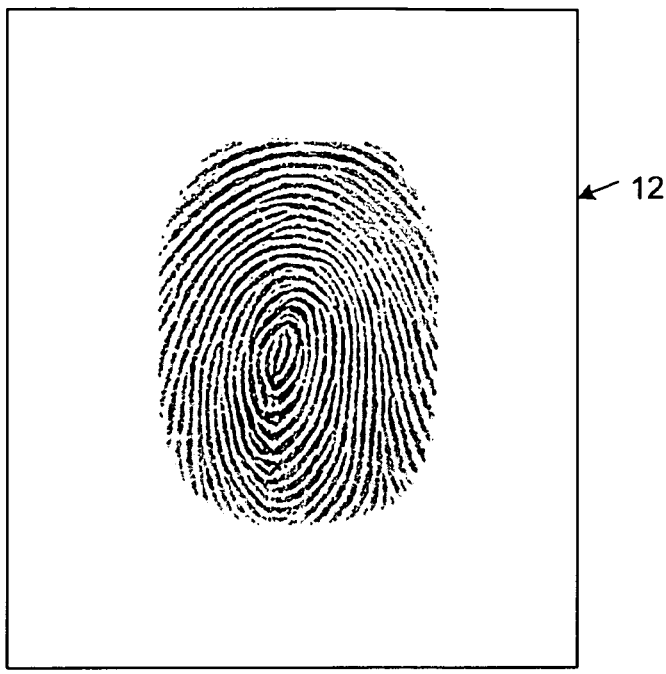
FIG. 3 is a diagrammatic view of a two-dimensional fingerprint image captured by the identification system embodiment of FIG. 1.

The enrollment process begins by setting the identification system 10 to a fingerprint capturing mode. The sensor 14 captures a two-dimensional image of the portion of the person's finger contacting the input surface (block 30). As explained above, in some implementations, the sensor 14 may have a field of view that is large enough to capture the entirety of the contacting portion of the person's finger so that a person merely has to place a stationary finger on the contact surface 12. In other implementations, the sensor 14 is configured to capture the two-dimensional fingerprint image in portions while the person's finger is swept across the field of view of the sensor 14. An exemplary two-dimensional fingerprint image that might be captured by sensor 14 is shown in FIG. 3.

After the sensor 14 has captured the two-dimensional fingerprint image (block 30), the processing system 16 computes reference fingerprint data from the captured fingerprint image (block 32). In some implementations, the processing system 16 computes reference fingerprint data by extracting singularities (e.g., core points and delta points) and minutia (e.g., ridge endings and ridge branches) from the fingerprint image, and categorizing characteristic patterns (e.g., arches, loops, and whorls) in the fingerprint image. The computed information is stored as reference fingerprint data in the form of a template (or signature) containing information describing the extracted features, including the coordinates and the orientation angles of the extracted features (block 34).

Figure 4:
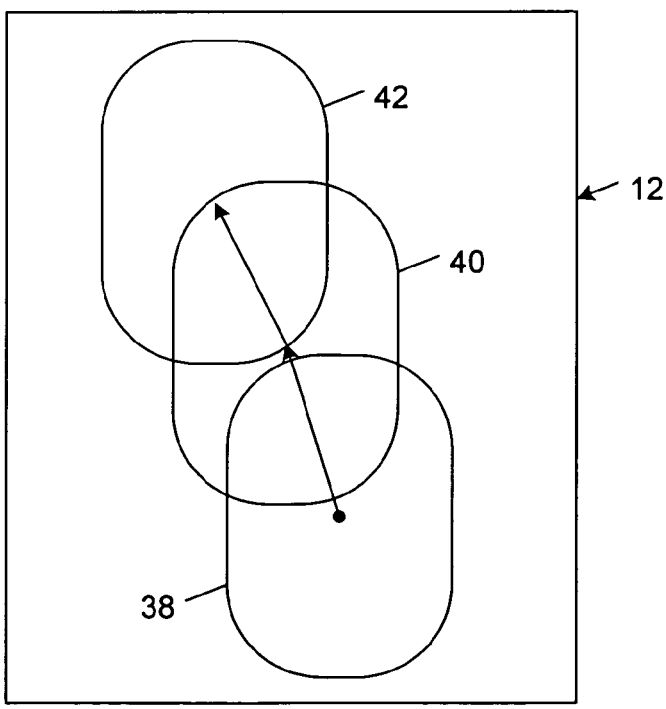
FIG. 4 is a diagrammatic view of multiple images of a person's finger captured by the identification system embodiment of FIG. 1 as the person's finger is moved over the input surface.

Next, the identification system 10 is set to navigation mode. In this operational mode, the sensor 14 captures finger trace data from movement of the person's finger over the input surface 12 (block 36). In some implementations, the sensor captures multiple images of the person's finger moving over the input surface 12. The images are captured at regularly spaced intervals and are time-stamped based on an internal system clock. An exemplary set of three consecutive images 38, 40, 42 captured by sensor 14 as a person's finger moved from the lower right corner of the input surface 12 to the upper left corner of the input surface 12 is shown in FIG. 4.

Processing system 16 receives the finger trace image data from the sensor 14 and maps the finger trace data to a reference personal identifier (block 44). In general, the processing system 16 may be configured to extract one or more features from the trace data and to interpret the time sequence of extracted features as a personal identifier. In some implementations, the processing system 16 is configured to compute directional data describing movement directions of the person's finger over the input surface 12 and to map (or translate) the directional data to a personal identifier.

In some embodiments, processing system 16 detects movement of the person's finger 22 based on comparisons between images of the input surface 12 that are captured by sensor 14. In particular, processing system 16 identifies structural or other features in the images and tracks the motion of such features across multiple images. Processing system 16 identifies common features in sequential images and determines the direction and distance by which the identified common features are shifted or displaced. In some implementations, processing system 16 correlates features identified in successive images to compare the positions of the features in successive images to provide information relating to the position of the person's finger 22 relative to the input surface 12. Additional details relating to the image processing and correlating methods performed by processing system 16 are found in U.S. Pat. Nos. 5,578,813, 5,644,139, 5,703,353, 5,729,008, 5,769,384, 5,825,044, 5,900,625, 6,005,681, 6,037,643, 6,049,338, 6,249,360, 6,259,826, and 6,233,368.

In some implementations, sensor 14 incorporates an optical navigation sensor (available from Agilent Technologies, Inc. of Palo Alto, Calif., U.S.A.), which computes movement data describing motion of the person's finger 22 over the input surface 12.

In other embodiments, processing system 16 detects movement of the person's finger 22 by tracking one or more features of the imaged portion of the person's finger across multiple images captured by sensor 14 in the navigation mode. In particular, when a person contacts an area of the input surface 12 with finger 22, the touched locations of the input surface 12 are distinguishable from other areas based on pixel intensity differences in the images captured by sensor 14. In the illustrated embodiment, the contacting area of finger 22 blocks ambient light from reaching sensor 14. As a result, the contacted area of input surface 12 appears darker than other areas of the input surface 12. In some embodiments, processing system 16 tracks the "center of mass" of the person's finger 22 as follows. Initially, pixel values (e.g., gray level values) in the input surface 12 are acquired from sensor 14. The pixel values then are segmented into two groups based on a threshold. For example, in the case of gray level pixel values, pixels with values that are less than 128 are assigned to a "black" pixel group, and pixels with values greater than or equal to 128 are assigned to a "white" pixel group. The threshold value that provides the most accurate results may be determined experimentally. The $x_{cm}$ and $y_{cm}$ coordinates corresponding to the center of mass of the contacted area of the input surface 12 are computed as follows:

$$x_{cm} = \frac{\sum_{\forall n=BlackPixels} x_n}{N_{BlackPixels}} \quad y_{cm} = \frac{\sum_{\forall n=BlackPixels} y_n}{N_{BlackPixels}}$$

where $x_n$ and $y_n$ are the x and y coordinate values for the black pixels and $N_{BlackPixels}$ is the number of black pixels. Processing system 16 then compares the center of mass coordinates ($x_{cm}$, $y_{cm}$) computed for different images to track the movement of the person's finger over the input surface 12.

As explained above, some implementations of identification system 10 are of the finger swipe type, in which sensor 14 includes an elongated imaging device with a narrow field of view of the input surface 12. In these implementations, the processing system 16 is operable to compute the directional data based on detected movements of the person's finger across the field of view of the imaging device.

Referring to FIG. 5, in some embodiments, processing system 16 translates each of the detected finger movements into one of eight directional symbols corresponding to north 46 (N), northeast 48 (NE), east 50 (E), southeast 52 (SE), south 54 (S), southwest 56 (SW), west 58 (W), and northwest 60 (NW). In these embodiments, a person traces a finger over the input surface 12 along a path corresponding to a personal finger trace passcode. The processing system 16 coverts the finger trace data captured by sensor 14 into a sequence of directional symbols that constitute a personal identifier corresponding to the finger trace passcode, where each directional symbol is demarcated by a change of direction along the finger trace. For example, the exemplary finger trace shown in FIG. 4 would be translated by processing system 16 into a personal identifier consisting of the symbol NW.

In general, the finger trace passcode entered by the person's finger 22 may consist of one or more movement directions. FIGS. 6A-6X show a set of exemplary finger trace passcodes, each of which consists of multiple movement directions. The processing system 16 translates the finger trace passcodes shown in FIGS. 6A-6X into the following personal identifiers.

TABLE

Translation Of Finger Trace Passcodes Into Personal Identifiers

| FIG. IN WHICH FINGER TRACE PASSCODE IS SHOWN | CORRESPONDING PERSONAL IDENTIFIER |
|---|---|
| 6A | S, N |
| 6B | S, E |
| 6C | S, W |
| 6D | S, NE |
| 6E | S, NW |
| 6F | S, NE, N, NW |
| 6G | S, NW, N, NE |
| 6H | S, NW, NE |
| 6I | S, NE, NW |
| 6J | S, NW, NE, NW |
| 6K | S, NE, NW, NE |
| 6L | S, N, S |
| 6M | S, E, W |
| 6N | S, W, E |
| 6O | SE, NE, SW |
| 6P | SW, NW, SE |
| 6Q | S, NE, N, NW, SW, S, SE |
| 6R | S, NW, N, NE, SE, S, SW |
| 6S | S, NE, N, NW, SE, S, SW |
| 6T | S, NW, N, NE, SW, S, SE |
| 6U | S, NE, NW, SW, SE |
| 6V | S, NW, NE, SE, SW |
| 6W | S, NE, NW, SE, SW |
| 6X | S, NW, NE, SW, SE |

Referring back to FIG. 2, after the processing system 16 has mapped the trace data to a reference personal identifier (block 44), the processing system 16 conveys to the person to be enrolled the translated personal identifier corresponding to the finger trace passcode entered by the person and prompts the person to confirm that the processing system 16 has interpreted the finger trace passcode correctly (block 62). If the person to be enrolled indicates that the translated personal identifier is incorrect, the processing system 16 prompts the person to re-enter the finger trace passcode and the process is repeated (blocks 36-62). If the translated personal identifier is correct, the processing system stores the reference personal identifier in memory 18 (block 64).

Figure 7:
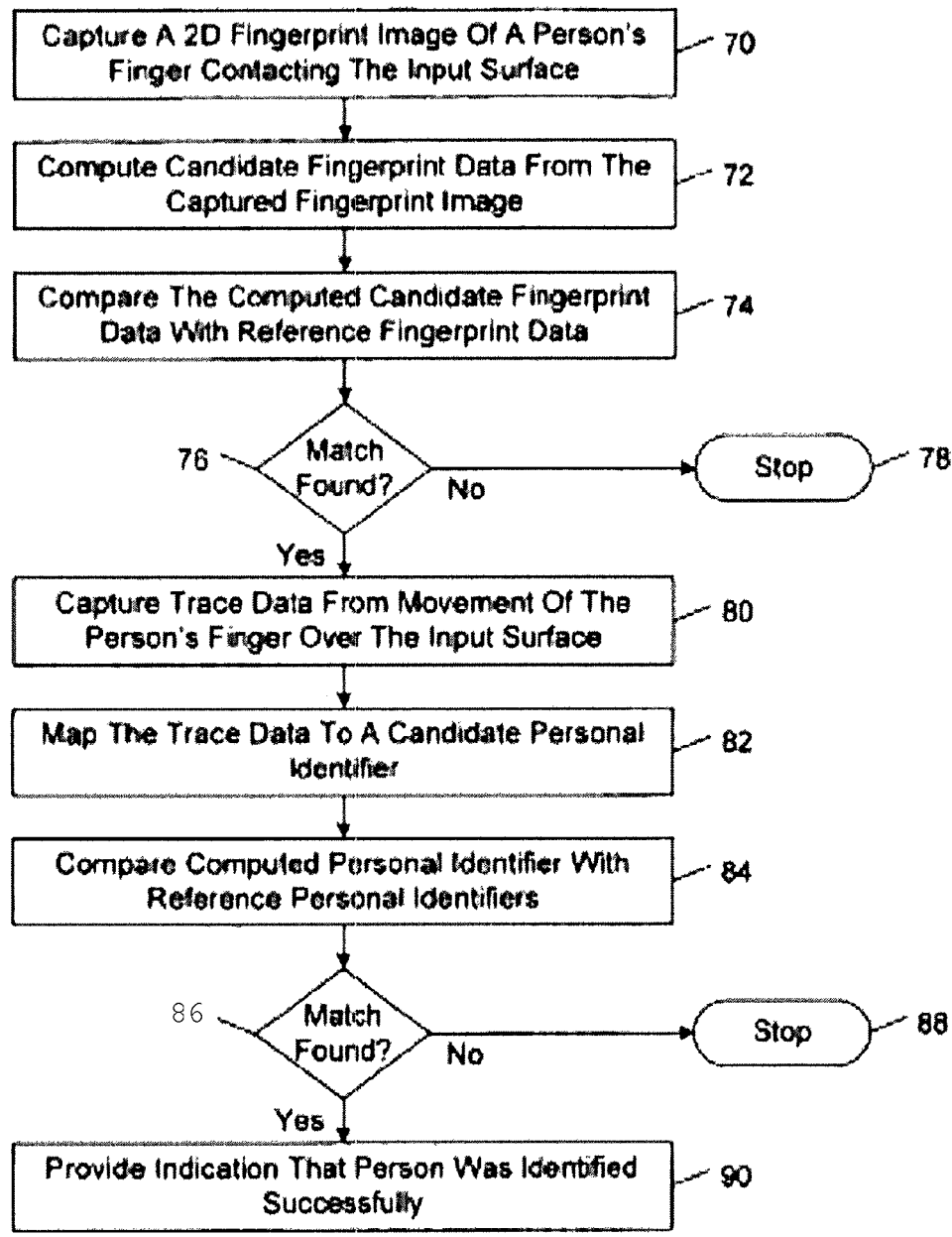
FIG. 7 is a flow diagram of an embodiment of an identification method.

FIG. 7 shows an embodiment of a method of identifying a person based on reference fingerprint data and reference personal identifiers previously stored in memory 18 for persons enrolled in the system in accordance with the embodiments described above. The processing steps described below are carried out in the same way as the corresponding processing steps described in detail above in connection with the enrollment embodiment shown in FIG. 2.

The enrollment process begins by setting the identification system 10 to a fingerprint capturing mode. The sensor 14 captures a two-dimensional image of the portion of the person's finger contacting the input surface 12 (block 70). After the sensor 14 has captured the two-dimensional fingerprint image (block 70), the processing system 16 computes candidate fingerprint data from the captured fingerprint image (block 72). The processing system 16 compares the computed candidate fingerprint data with reference fingerprint data that was stored in memory 18 for persons enrolled in the system (block 74). In some implementations, the processing system 16 compares the computed candidate fingerprint data with reference fingerprint data by computing a measure of similarity between the candidate fingerprint data and each set of reference fingerprint data. The similarity measure may be computed, for example, based on a point pattern matching technique or a graph-theory-based matching technique. If no matching reference fingerprint data is found (block 76), the process is terminated (block 78). Otherwise, the process continues as follows.

Next, the identification system 10 is set to navigation mode. In this operational mode, the sensor 14 captures finger trace data from movement of the person's finger over the input surface 12 (block 80). Processing system 16 receives the finger trace image data from the sensor 14 and maps the finger trace data to a candidate personal identifier (block 82). The processing system 16 compares the computed candidate personal identifier with the reference personal identifier that was stored in memory 18 for the person whose fingerprint match was found in block 76 (block 84). If the candidate personal identifier does not match the previously stored reference personal identifier (block 86), the process is terminated (block 88). Otherwise, processing system 16 provides an indication that the person was identified successfully (block 90).

The finger-based identification embodiments described in detail above may be embedded in the hardware of any one of a wide variety of electronic systems and devices, including personal computes, digital cameras, printers, and portable electronic devices (e.g., laptop computers, mobile phones, and personal digital assistants).

Figure 8:
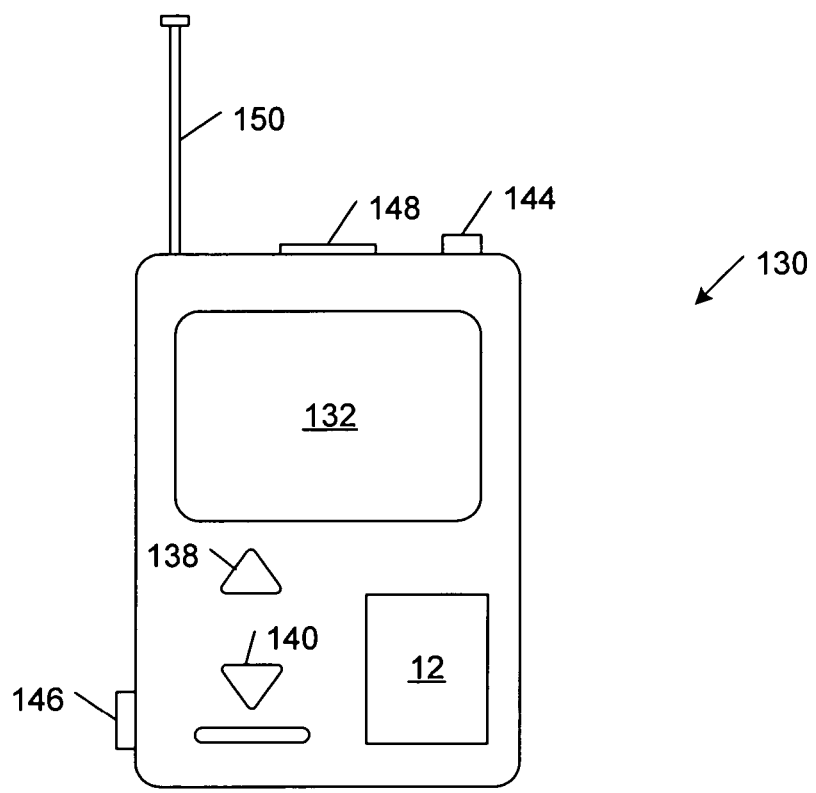
FIG. 8 is a block diagram of an embodiment of a portable electronic device incorporating the identification system of FIG. 1.

Referring to FIG. 8, in some embodiments, the finger-based identification embodiments described above are incorporated in a handheld electronic device 130. Handheld electronic device 130 includes a screen 132 that displays a graphical user interface, which may present one or more user options for controlling the operation of handheld electronic device 130. Handheld electronic device 130 also includes various user controls, including one or more control buttons 138, 140. Handheld electronic device 130 has an output port 144 for connecting to an input jack of an audio output device (e.g., headphones), and a cable port 146 for connecting to a computer or other hardware system. Handheld electronic device 130 further includes a wireless communication port 148, for example, an IrDA (Infrared Data Association) port, through which handheld electronic device 130 may wirelessly communicate with other similarly configured devices. Some embodiments may include an RF antenna 150 instead of, or in addition to, wireless communication port 148. The handheld electronic device 130 also may have a communication subsystem that includes a network adapter that is configured to communicate through cable port 146 and a transceiver that is configured to communicate through wireless communication port 148 (or antenna 150). Handheld electronic device 130 also may have a digital content rendering subsystem that includes an audio adapter that is configured to transmit digital audio data signals to one or more speakers, and a display adapter that is configured to transmit image data signals to display screen 132. The handheld electronic device 130 also may include a controller that is configured to choreograph the operation of handheld electronic device 130. Handheld electronic device also may have a memory that may include a random access memory (RAM) and a read only memory (ROM). In some embodiments, one or more other storage technologies may be used, including an internal hard drive and a removable storage device (e.g., a removable hard drive, storage card or disk). A battery power supply supplies the electrical power needed to operate handheld electronic device 130.

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. An identification method, comprising:
causing an identification system to enter a fingerprint capturing mode;
while the identification system is in the fingerprint capturing mode, capturing a two-dimensional fingerprint image of a person's finger contacting an input surface;
while the identification system is in the fingerprint capturing mode, converting the two-dimensional fingerprint image into candidate fingerprint data;
while the identification system is in the fingerprint capturing mode, comparing the candidate fingerprint data with each reference fingerprint data in a set of reference fingerprint data;
based on the comparison of the candidate fingerprint data with the set of reference fingerprint data, identifying a first reference fingerprint data that matches the candidate fingerprint data more than any other reference fingerprint data in the set of reference fingerprint data, the first reference fingerprint data corresponding to reference fingerprint data of a first enrolled person;
after identifying the first reference fingerprint data, causing the identification system to enter a navigation mode;
while the identification system is in the navigation mode, capturing finger trace data of a movement of the person's finger relative to the input surface as the person's finger moves relative to the input surface;
converting the finger trace data into a sequence of directional symbols to form a candidate trace data passcode;
mapping the candidate trace data passcode into a candidate personal identifier;
obtaining a reference personal identifier associated with the first enrolled person identified during the fingerprint capturing mode;
comparing the candidate personal identifier with the reference personal identifier; and determining that the person corresponds to the first enrolled person only if the candidate personal identifier matches the reference personal identifier.

2. The method of claim 1, wherein the two-dimensional image is captured in portions during a period of relative movement between the person's finger and the input surface.

3. The method of claim 1, wherein the identification system does not operate simultaneously in the fingerprint capturing mode and the navigation mode.

4. The method of claim 3, wherein a similarity between the candidate fingerprint data and each reference fingerprint data in the set of reference fingerprint data is computed using at least one of a pattern matching technique and a graph-theory-based matching technique and wherein the first reference fingerprint data comprises a similarity that at least one of meets and exceeds a threshold measure of similarity to define a match between the candidate fingerprint data and the first reference fingerprint data.

5. The method of claim 1, wherein converting the captured finger trace data comprises computing directional data describing movement directions of the person's finger over the input surface.

6. The method of claim 1, wherein capturing finger trace data comprises capturing multiple images of the person's finger moving over the input surface.

7. The method of claim 6, further comprising tracking fingerprint features across the multiple images, wherein tracking fingerprint features comprises correlating fingerprint features across the multiple images.

8. The method of claim 1, wherein the set of reference fingerprint data at least includes second reference fingerprint data corresponding to a reference fingerprint data of a second enrolled person in addition to comprising the first reference fingerprint data.

9. The method of claim 1, wherein the first reference fingerprint data includes at least one of singularities extracted from the two-dimensional fingerprint image, minutia extracted from the two-dimensional fingerprint image, and characteristic patterns extracted from the two-dimensional fingerprint image.

10. The method of claim 1, further comprising enrolling a person by:
    capturing a two-dimensional fingerprint image of a person's finger contacting an input surface;
    computing reference fingerprint data from the captured two-dimensional fingerprint image;
    capturing finger trace data from movement of the person's finger over the input surface;
    mapping the captured finger trace data to a candidate personal identifier; and
    storing the reference fingerprint data and the candidate personal identifier.

11. An identification system, comprising:
    an input surface;
    a sensor operable to capture a two-dimensional fingerprint image of a person's finger contacting an input surface during a capturing mode and to capture finger trace data of a movement of the person's finger relative to the input surface as the person's finger moves relative to the input surface during a finger navigation mode;
    a processing system operable switch between operating in the capturing mode and the navigation mode, the processing system being further operable, while in the capturing mode, to perform the following:
        convert the two-dimensional fingerprint image into candidate fingerprint data;
        compare the candidate fingerprint data with each reference fingerprint data in a set of reference fingerprint data; and
        based on the comparison of the candidate fingerprint data with the set of reference fingerprint data, identify a first reference fingerprint data that matches the candidate fingerprint data better than any other reference fingerprint data in the set of reference fingerprint data, the first reference fingerprint data corresponding to reference fingerprint data of a first enrolled person;
    the processing system being further operable, while in the navigation mode, to perform the following:
        convert the finger trace data into a sequence of directional symbols to form a candidate trace data passcode;
        map the candidate trace data passcode into a candidate personal identifier;
        obtain a reference personal identifier associated with the first enrolled person identified during the fingerprint capturing mode;
        compare the candidate personal identifier with the reference personal identifier; and
        determine that the person corresponds to the first enrolled person only if the candidate personal identifier matches the reference personal identifier.

12. The system of claim 11, wherein the sensor is operable to capture the two-dimensional fingerprint image in portions during a period of relative movement between the person's finger and the input surface.

13. The system of claim 11, wherein the processing system does not operate simultaneously in the capturing mode and the navigation mode.

14. The system of claim 13, wherein a similarity between the candidate fingerprint data and each reference fingerprint data in the set of reference fingerprint data is computed using at least one of a pattern matching technique and a graph-theory-based matching technique and wherein the first reference fingerprint data comprises a similarity that at least one of meets and exceeds a threshold measure of similarity to define a match between the candidate fingerprint data and the first reference fingerprint data.

15. The system of claim 13, wherein the processing system is operable to compute directional data describing movement directions of the person's finger over the input surface.

16. The system of claim 11, wherein the sensor is operable to capture multiple images of the person's finger moving over the input surface.

17. The system of claim 16, wherein the processing system is operable to track fingerprint features across the multiple images.

18. The system of claim 17, wherein the processing system is operable to track fingerprint features by correlating fingerprint features across the multiple images.

19. The system of claim 11, wherein the processing system is operable to match the captured two-dimensional fingerprint image to reference fingerprint data obtained from at least one enrolled person.

20. The system of claim 11, wherein the processing system is operable to enroll a person by:
    computing reference fingerprint data from a two-dimensional fingerprint image of a person's finger contacting the input surface;
    mapping finger trace data captured from movement of the person's finger over the input surface to a candidate personal identifier; and
    storing the reference fingerprint data and the candidate personal identifier.

21. The method of claim 1, wherein the capturing of the finger trace data comprises capturing the finger trace data while the person's finger is moving in contact with the input surface.

22. The method of claim 1, wherein the first reference fingerprint data includes at least one of singularities extracted from the two-dimensional fingerprint image, minutia extracted from the two-dimensional fingerprint image, and characteristic patterns extracted from the two-dimensional fingerprint image.

* * * * *